P. HUGON.
Pressure Gages.

No. 150,045.

Patented April 21, 1874.

Witnesses.
Ezell Dick
W. B. Chaffee

Inventor.
Pierre Hugon by
atty A Pollok

3 Sheets--Sheet 2.
P. HUGON.
Pressure Gages.
No. 150,045. Patented April 21, 1874.
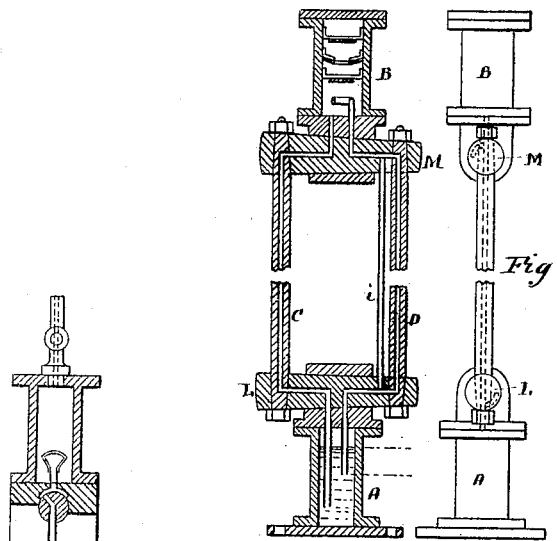
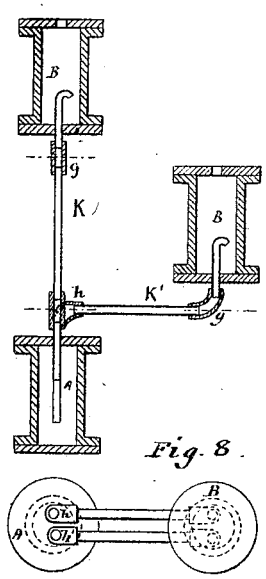
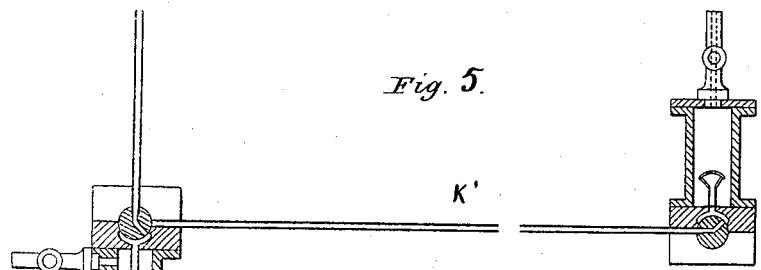
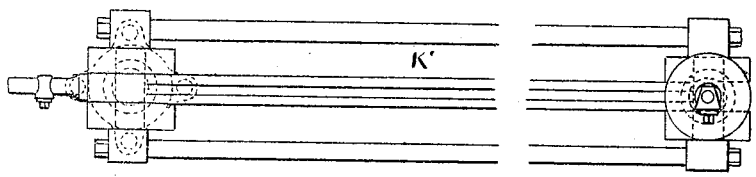
Witnesses
Ewell Dick
W. P. Chaffee
Inventor
Pierre Hugon
by atty Pollok 3 Sheets--Sheet 3.
P. HUGON.
Pressure Gages.
No. 150,045.  Patented April 21, 1874.
Fig. 11.
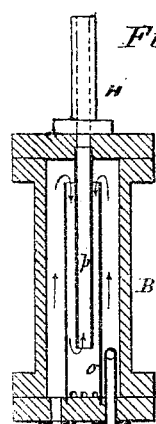
Fig. 14.
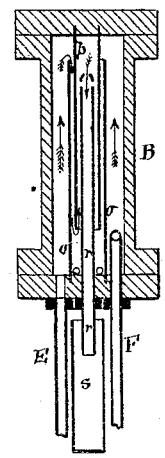
Fig. 16.
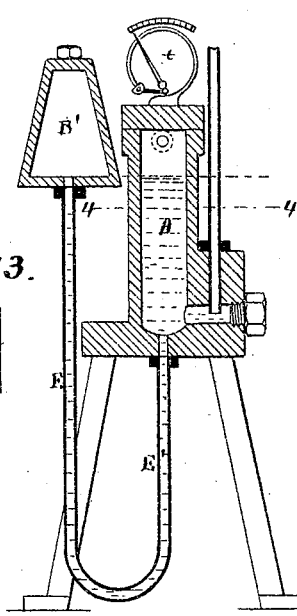
Fig. 13.
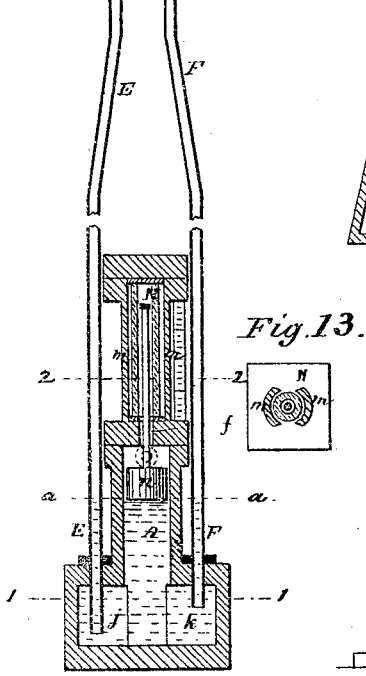
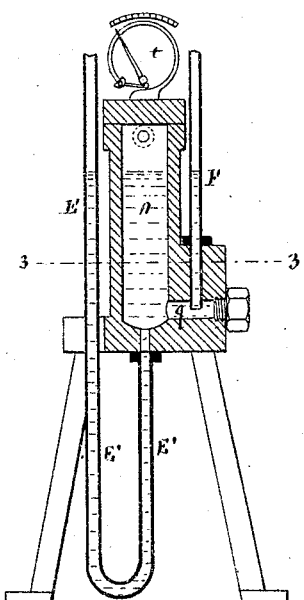
Fig. 12.
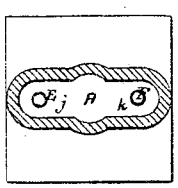
Fig. 17.
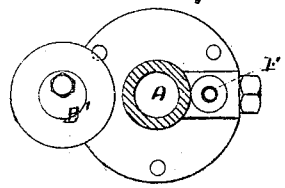
Fig. 15.
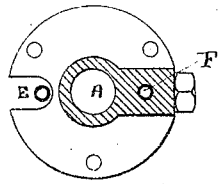
Witnesses
Ewell Dick
Wm E Chaffee
Inventor
Pierre Hugon
by atty A Bush

UNITED STATES PATENT OFFICE.

PIERRE HUGON, OF PARIS, FRANCE.

IMPROVEMENT IN PRESSURE-GAGES.

Specification forming part of Letters Patent No. 150,045, dated April 21, 1874; application filed March 31, 1874.

*To all whom it may concern:*

Be it known that I, PIERRE HUGON, of Paris, France, have invented certain new and useful Improvements in Pressure-Gages on Manometers, of which the following is a specification:

This invention relates to that class of manometers or pressure-gages in which the indications are obtained by means of a column of mercury or other liquid in an open tube. Such pressure-gages, as at present made, are open to several objections, one of the most material of which is that under sudden variations of pressure the mercury or other liquid is liable to be ejected from the tube, and when this occurs it becomes necessary to shut off communication between the mercury or liquid reservoir and the fluid under pressure until the mercury ejected from the tube has been returned or restored to the reservoir.

This very serious objection and obstacle to the use of such manometer it is the object of my invention to remove and overcome.

The nature of my invention, and the manner in which the same is or may be carried into effect, can be best explained and understood by reference to the accompanying drawings, in which I have represented several forms of apparatus, all of which, however, embody the same general principle.

Figure 1 is a vertical central section of a gage, which illustrates clearly the characteristic features of my invention. Fig. 2 is a plan of the same.

It is composed of a lower and an upper cylinder or other vessel, A and B, of glass, metal, or other suitable material. The two cylinders are closed at top and bottom, and are maintained in proper relation by means of standards or tie-rods C D; and they communicate with one another through tubes E F, of glass, metal, or other suitable material. The lower cylinder at the top should be provided with a cock, for admission of steam or other fluid under pressure; and the upper cylinder should have an escape-cock, H, or an escape-pipe, which may open to the atmosphere, or lead into a suitable receptacle. Cylinder A is filled with mercury to the level *a*, and the tubes E F extend different depths into the liquid, E extending to a greater depth than F. On the other hand, F rises to a greater height than E in the upper cylinder B. If, now, there be admitted to cylinder A air, steam, or gas, at a pressure exceeding atmospheric pressure— one-half an atmosphere, for instance—the mercury will rise equally in tubes E F to one-half their height—say thirty-eight centimeters of mercury, supposing the tubes to be gaged for one atmosphere. Then, if the pressure is increased to one atmosphere, the mercury will still rise equally in both tubes until it reaches the cylinder B, in which it will continue to rise until the mercury remaining in cylinder A has fallen below the lower level of tube F. As soon as the lower end of this tube is thus uncovered the air, steam, gas, or other fluid under pressure will escape through tube F into cylinder B, driving before it the mercury remaining in tube F, and this escaping fluid will thence be discharged through the cock or opening H, without any of the mercury escaping from cylinder B. The escape through tube F of the fluid under pressure will continue so long as the pressure in the cylinder A is equal to or in excess of one effective atmosphere, the column of mercury contained in tube E being seventy-six centimeters above the lower level of tube F. If the pressure falls below one atmosphere the mercury will immediately rise in cylinder A, thus closing the lower end of tube F, in which the mercury will consequently again rise, and there will be no further escape until the pressure in cylinder A again reaches one atmosphere. If the two tubes are only thirty-eight centimeters in height, in lieu of seventy-six centimeters, the escape of steam or other fluid will take place at a pressure of half an atmosphere; and thus, by gaging or regulating the height of the tubes, the apparatus can be gaged or adjusted to any desired pressure, either above or below one atmosphere.

It will thus be seen that this gage becomes a safety-valve, since it is impossible with it to exceed the maximum pressure determined by the height of the mercury column without notice of this being immediately given by the escape of the fluid under pressure through the cock or tube H, which may be provided, if desired, with a whistle, or any suitable sounding instrument, or other signal, to be operated by the escaping fluid; and it will also be seen that so soon as the pressure falls below the prescribed limit, the apparatus is at once hermetically sealed against further escape of the fluid.

If one or both of the tubes E F are of glass, the pressure may be gaged by means of a scale, either marked on them, or placed by their side in proximity to the mercury column. If they be of metal, an auxiliary indicating-gage—one on the Bourdon principle, for example—may be mounted on cylinder A, communicating with the interior of said cylinder; or any other of the known indicators may be used—for example, a piston or float within tube E connected to an external needle or pointer, or a chain carrying a weight, serving to mark the successive pressures, as indicated in Fig. 1.

In the manometer or pressure-gage just described the pressure at which the gas or steam or other fluid can escape is, as has been stated, determined by the length or height of the tubes. If it be desired to vary the escape so that it may take place at different pressures lower than the maximum, this can readily be done by jointing the tubes E F and rods C D, so that the upper cylinder B may be lowered more or less, as desired. This arrangement is shown in Fig. 3. The apparatuses there shown is exactly the same in principle as the one in Fig. 1. I have, however, represented two manometers side by side. The one, K, is jointed, and can occupy successively all positions intermediate between the vertical and horizontal. The other, I, is the manometer shown in Fig. 1, and is only here shown in juxtaposition in order to facilitate the explanation. The two are connected to the same receptacle A. The structure of the two gages is identical, except that the tubes E F and stays or rods C D, in lieu of being connected directly to the upper and lower receptacles, are united to axes or pins G J on said parts, which are capable of rotating, and are pierced and formed with suitable channels, so as to put said tubes at all times in communication with the upper and lower receptacles. The communication with the lower receptacle A is effected through the base, on which the lower bearing J rests, by means of two channels, c d, the one, c, at the height of the lower level of tube F of manometer I, in communication with tube F of manometer K, and the other, d, at the lower level of tube E of manometer I, in communication with tube E of manometer K. One of the stays C D is provided with a slide, e, embracing a curved stationary guide-piece, f, by which the apparatus may be maintained at any position between the vertical and horizontal. Under this arrangement the manometer K can be shifted to any desired position, so as to regulate the working height of its tubes E F. It is shown in three positions in the drawing—the vertical, indicated by letters J D E G B; the horizontal, indicated by letters J E' G' B'; and a position intermediate between the vertical and horizontal, indicated by dotted lines.

Fig. 5 represents the same apparatus without the manometer I. K is the manometer in an upright position, and K' the same in the horizontal.

Fig. 6 is a plan of K'.

Figure 1:
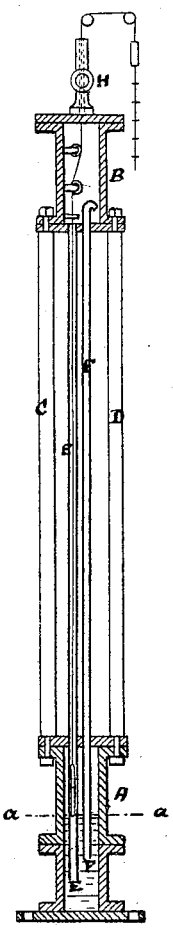
Figure 3:
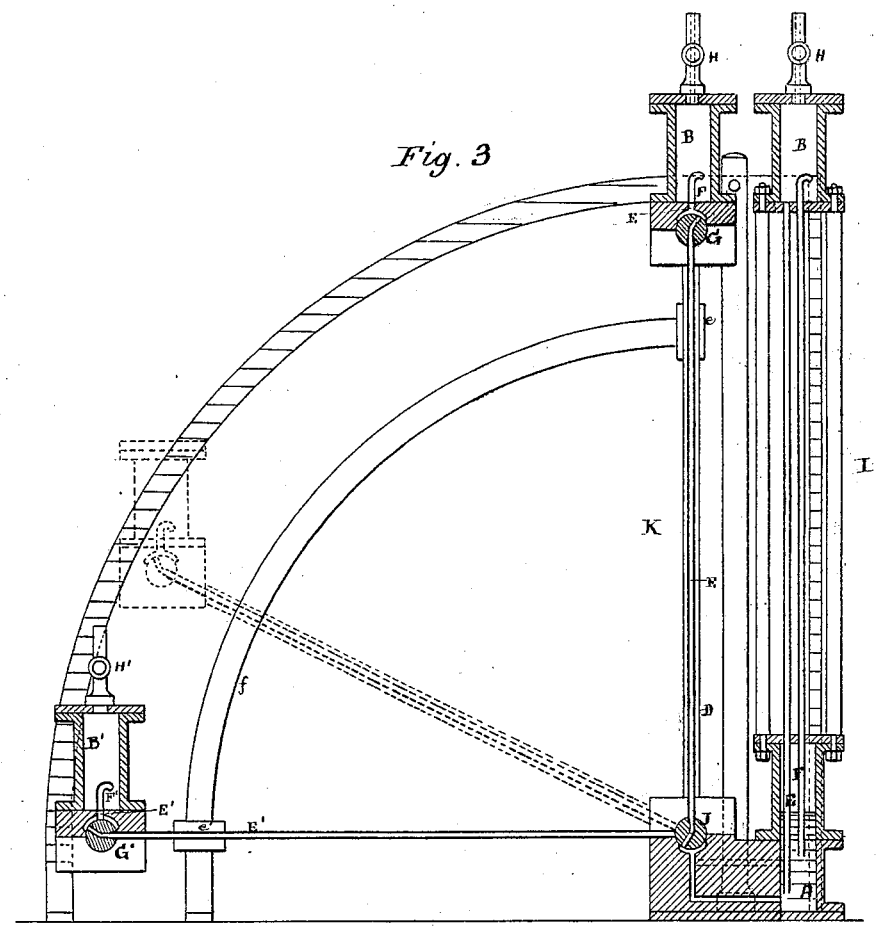
Figure 2:
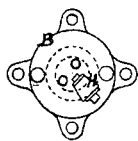
Figure 4:
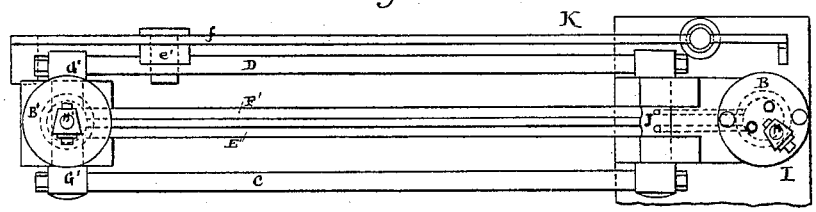
Fig. 4 is a plan view of the apparatus, with the manometer K in the horizontal position.

In lieu of the axes G J, the same result may be arrived at by providing the tubes E F with flexible joints, as indicated in Fig. 7, where each tube is provided with sleeves g h of rubber, or other equivalent flexible material, at their upper and lower ends, connecting them with prolongations communicating with the two cylinders A B. In this figure K is the manometer in the vertical position, and K' the same in the horizontal.

Fig. 8 is a plan of K'.

In lieu of employing separate tubes and stay-rods, I can make the latter serve both purposes, as indicated in Figs. 9 and 10.

Fig. 9 is a longitudinal section of the manometer in the plane of the axes of the rods.

Fig. 10 is a side elevation of the same. In this instance the upper and lower cylinders are formed with bearings to receive conical or tapering axes or rotating hubs L M, to which are connected the rods C D. The rods in this instance are tubular and communicate, in whatever position the manometer may be, through suitable channels and ducts in the two conical hubs, with extensions or prolongations of said channels leading into the interior of the cylinders, the arrangement being such that rod C and its prolongations answer to tube E, and the rod D and its connections answer to tube F. The manometer is thus jointed so as to be adjustable, and the rods connecting the two cylinders serve also as channels of communication between the same. In the upper cylinder I have represented a series of diaphragms, one above the other, interposed between the upper ends of the tubes and the escape in the top in the cylinder, and arranged so as to break joint, in order to prevent escape of mercury. Between the two hubs L M there may extend a glass indicating or gage tube i, communicating at its lower end with that channel in hub L which constitutes a prolongation of rod D.

Figure 11 is a vertical central section of another form of apparatus embodying the same general principle illustrated in the figures previously described.

The mercury-vessel A is cylindrical internally, and is in communication with the tubes E F through side passages j k. On the head or top of the vessel is mounted a thick glass tube, N, closed at top and communicating with the vessel through aperture $l$, and surrounded by a sectional guard, $m$, to which may be affixed a scale indicating the various degrees of pressure. A float, $n$, rests on the mercury in vessel A, and is provided with a rod carrying a button of red or other color, working freely in the glass tube N. Tubes E F connect the lower vessel A with the upper one B, as before described. In cylinder B is a tube, $o$, extending from the bottom to nearly the top of said cylinder; and also another tube, $p$, within and concentric with $o$, extending from the top to near the bottom of the cylinder, and opening into escape H.

This apparatus possesses the following features over those previously described: First, the indicating apparatus consisting of the glass tube, the internal float, and the scale by which degrees of pressure may be ascertained; second, the two tubes $o$ $p$, (or three, four, or more of said tubes arranged on the same plan,) in the upper cylinder B, constituting a simple and effective device for preventing the mercury being ejected by sudden variations of pressure.

Fig. 12 is a section on line 1 1, Fig. 11. Fig. 13 is a section on line 2 2, Fig. 11.

Fig. 14 represents, in vertical section, still another modification, and one that I find very effective in practice. In common with the apparatus previously described, it embraces the combination of upper and lower receivers A B, and intermediate pressure and escape tubes E F, extending down to different levels, the lower level of the tube E being below that of tube F. This arrangement of the tubes is, in the present instance, effected by connecting the escape-tube F with a lateral orifice, $q$, in cylinder A, and connecting the pressure-tube E with the same cylinder through an aperture in the bottom of the said cylinder, the tube extending down some distance below the bottom of the cylinder, and then returning upwardly to the cylinder B. A U-bend is thus formed in the tube E. The length of the leg E′ of this U can be varied according to the pressure. This arrangement (which can be variously modified) has for its object to always maintain mercury in the tube F, and consequently to maintain a constant and regular pressure, proportionate to the height of the column, on the fluids which enter the receptacle A under pressure.

In cylinder B I have the same arrangement of tubes ($o$ $p$) that is seen in Fig. 11; but, in the present instance, tube $p$ is not in direct communication with the escape H. The escape is provided for by having a third and smaller concentric tube, $r$, within tube $p$, and extending up from the bottom to near the top of the cylinder B. This third tube $r$ extends through the bottom of the cylinder, and may be provided with a whistle or other warning device. It extends into a vessel or receiver, $s$, which will catch any particles of mercury that by any chance may be ejected along with the fluids under pressure.

The cylinder A may be provided with an indicating apparatus, such as represented in Fig. 11; or with a Bourdon indicator, as shown at $t$, Fig. 14. Fig. 15 is a section on the line 3 3, Fig. 14.

In lieu of having the two tubes E F discharge into the same upper vessel B, they may each discharge into a separate vessel. This arrangement is indicated in vertical section in Fig. 16, which apparatus is identical with that shown in Fig. 14, save that the curved pressure-tube E opens into an upper receptacle, B′, distinct from the one B, into which the tube F discharges. The receiver B′ is hermetically closed, and is filled with air. In this way, when the mercury is forced up in the tube E, the air in the vessel B′, being compressed, exercises a pressure against the fluids under pressure. Fig. 17 is a plan of the apparatus, partly in horizontal section, on line 4 4, Fig. 16.

The above-described apparatus will serve to indicate the variety of ways in which my invention may be carried into effect without departure from the principle which is embraced in the combination with upper and lower receivers of pressure and escape tubes communicating with and connecting said receivers, and operating in the manner described by reason of the difference between their lower levels, the lowest point to which the pressure-tube extends being below that to which the escape-tube extends. This combination of elements is found in all the apparatus herein shown.

What I claim, and desire to secure by Letters Patent, is—

A manometer or pressure-gage, in which the upper and lower receivers or cylinders are combined with intermediate tubes, the one a pressure-tube, the other an escape-tube, communicating with said receivers, and operating in connection therewith, substantially in the manner shown and set forth.

In testimony whereof I have signed my name to this specification before two subscribing witnesses.

P. HUGON.

Witnesses:
EMIL BARRAULT,
AUG. VINEK.